US009440648B2

(12) United States Patent
Uechi

(10) Patent No.: US 9,440,648 B2
(45) Date of Patent: Sep. 13, 2016

(54) VEHICLE SAFETY APPARATUS

(71) Applicant: Masaaki Uechi, Nagoya (JP)

(72) Inventor: Masaaki Uechi, Nagoya (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 14/439,007

(22) PCT Filed: Oct. 30, 2012

(86) PCT No.: PCT/JP2012/078027
§ 371 (c)(1),
(2) Date: Apr. 28, 2015

(87) PCT Pub. No.: WO2014/068671
PCT Pub. Date: May 8, 2014

(65) Prior Publication Data
US 2015/0298693 A1    Oct. 22, 2015

(51) Int. Cl.
| *G06F 7/70* | (2006.01) |
| *B60W 30/09* | (2012.01) |
| *B60T 7/22* | (2006.01) |
| *B60Q 9/00* | (2006.01) |
| *G06K 9/00* | (2006.01) |
| *G01S 13/93* | (2006.01) |
| *B60K 31/00* | (2006.01) |

(52) U.S. Cl.
CPC .............. *B60W 30/09* (2013.01); *B60Q 9/008* (2013.01); *B60T 7/22* (2013.01); *B60K 31/0008* (2013.01); *B60W 2710/18* (2013.01); *G01S 2013/9382* (2013.01); *G06K 9/00369* (2013.01); *G06K 9/00805* (2013.01)

(58) Field of Classification Search
CPC .................. B60K 31/0008; B60K 2031/0016; B60Q 9/008; B60T 8/17558; G01S 13/931; G01S 13/42; G01S 2013/9375; G01S 2013/9378; G01S 2013/9385; G01S 2013/9382; G01S 2013/9357; G06K 9/00369; G06K 9/00805
USPC ............ 701/70, 96, 300, 301; 382/107, 103, 382/104, 106, 291; 348/149, 169; 340/435, 340/903, 906
See application file for complete search history.

(56) References Cited

U.S. PATENT DOCUMENTS 6,035,053 A * 3/2000 Yoshioka ........... B60K 31/0008
340/435

FOREIGN PATENT DOCUMENTS

| JP | 2000-251200 | 9/2000 |
| JP | 2005-145282 A | 6/2005 |
| JP | 2007-251257 | 9/2007 |
| JP | 2008-71087 | 3/2008 |
| JP | 2011-198247 | 10/2011 |

* cited by examiner

*Primary Examiner* — Gertrude Arthur Jeanglaude
(74) *Attorney, Agent, or Firm* — Finnegan, Henderson, Farabow, Garrett & Dunner, LLP

(57) ABSTRACT

When a pedestrian or the like in an area that is ahead in the direction of movement of a vehicle travelling on a road and is adjacent to the road is moving in an direction to cross the road, a system ECU varies the time of execution of a safety operation for ensuring the safety of the pedestrian in accordance with a road condition in the area where the pedestrian or the like is present. Specifically, the time of execution of the safety operation is delayed in the order of a first road condition, in which the area in which the pedestrian is present is not in a roadway, a second road condition, in which the area is in a roadway and not in an opposing traffic lane, and a third road condition, in which the area is in a roadway and in an opposing traffic lane.

7 Claims, 5 Drawing Sheets

VEHICLE SAFETY APPARATUS

TECHNICAL FIELD

The present invention relates to a vehicle safety apparatus.

BACKGROUND ART

It has been proposed that a vehicle such as an automobile be equipped with a safety apparatus to ensure the safety of a moving living body (e.g., a pedestrian) present ahead in the advancing direction of the vehicle. Such a safety apparatus is provided, with a controller that executes a safety operation to ensure the safety of a pedestrian when the pedestrian in an area that is ahead in the advancing direction of a vehicle traveling on a road and is adjacent to the road moves in a direction that crosses the road. Examples of such a safety operation are warning the vehicle driver or performing an automatic braking operation, in which the brake of the vehicle is automatically turned on.

A determination whether to execute the safety operation may be made in the following manner. First, the degree of danger is obtained according to the moving speed and position of a pedestrian, and then the safety operation is executed if the degree of danger is equal to or higher than a threshold value, as described in Patent Document 1. The execution time of such a safety operation varies according to the magnitude of the threshold value. That is, the larger the threshold value is set, the later the execution time of the safety operation (i.e., the safety operation is executed when the pedestrian is closer to a vehicle). In contrast, the smaller the threshold value is set, the earlier the execution time of the safety operation (i.e., the safety operation is executed when the pedestrian is farther from the vehicle).

PRIOR ART DOCUMENTS

Patent Documents

Patent Document 1: Japanese Laid-Open Patent Publication No 2000-251200

SUMMARY OF THE INVENTION

Problems that the Invention is to Solve

To decelerate a vehicle in order to avoid hitting a pedestrian crossing a road on which the vehicle is traveling, time to recognize the pedestrian and time to operate a brake are required. It is important to initiate a safety operation taking account of these times and the movement of the pedestrian. In order to initiate the safety operation in such a manner, the execution time of the safety operation may be set at an earlier stage, that is, a threshold value may be set to a smaller value. However, a pedestrian may suddenly change his or her moving direction, or stop. Therefore, if the execution time of the safety operation is set at an earlier stage (the threshold value is set to a smaller value), as described above, the safety operation may prove unnecessary due to the pedestrian's changing, after execution of the safety operation, his or her movement, such as changing his or her moving direction, or stopping. In such a case, the driver may feel that the safety operation was unnecessarily executed, and he or she may experience discomfort due to the unnecessary execution.

It is accordingly an object of the present invention to provide a vehicle safety apparatus that is able to reduce unnecessary execution of a safety operation, while ensuring the safety of a moving living body, e.g., a pedestrian.

Means for Solving the Problems

To achieve the foregoing objective and in accordance with one aspect of the present invention, a vehicle safety apparatus equipped with a controller is provided. When a moving living body in an area that is ahead in advancing direction of a vehicle traveling on a road and is adjacent to the road moves in a direction that crosses the road, the controller executes a safety operation to ensure safety of the moving living body. The controller is configured to change an execution time of the safety operation according to the road condition of the area where the moving living body is present. The probability that the moving living body will cross a road on which the vehicle is running changes according to the road condition in which the moving living body is present. Therefore, by changing the execution time of the safety operation according to the road condition, the execution time can be made appropriate such that, while the safety of the moving living body is ensured, unnecessary executions of the safety operation are reduced. Accordingly, by variably setting the execution time of the safety operation according to the road condition in such a manner, the safety of the moving living body is ensured through the safety operation, while unnecessary execution of the safety operation can be reduced.

The above described vehicle safety apparatus may be configured such that the controller determines whether the road condition of the area where the moving living body is present is either a roadway and an opposing traffic lane or a roadway and other than an opposing traffic lane. If the road condition is a roadway and other than an opposing traffic lane, the controller makes the execution time of the safety operation later than that used when the road condition is a roadway and an opposing traffic lane. When the area where the moving living body is present is a roadway and an opposing traffic lane, the probability that the moving living body will cross the road where the vehicle is traveling is high. In contrast, even if the area where the moving living body is present is a roadway and other than an opposing traffic lane, the moving living body may not cross the road where the vehicle is traveling. Therefore, as described above, when the area where the moving living body is present is a roadway and other than an opposing traffic lane, the execution time of the safety operation is made later than when the area is a roadway and an opposing traffic lane. Thereby, the execution time is made appropriate such that while the safety of the moving living body is ensured, unnecessary execution of the safety operation is reduced. Specifically, the higher the probability that the moving living body will cross the road on which the vehicle is traveling, as when the area where the moving living body is present is a roadway and an opposing traffic lane, the earlier the execution time of the safety operation. Thus, the safety of the moving living body is ensured. In contrast, even when the moving living body will not necessarily cross the road on which the vehicle is traveling, as when the area where the moving living body is present is a roadway and other than an opposing traffic lane, the execution time of the safety operation is delayed, thus reducing unnecessary execution of the safety operation.

The above described vehicle safety apparatus may be configured such that the controller determines whether the road condition of the area where the moving living body is present is a roadway or other than a roadway. If the road condition is other than a roadway, the controller makes the execution time of the safety operation later than that used when the road condition is a roadway. When the area where the moving living body is present is a roadway, the probability that the moving living body will cross the road where the vehicle is traveling is high. In contrast, when the area where the moving living body is present is other than a roadway (i.e., a sidewalk or the like), the moving living body will not necessarily cross the road where the vehicle is traveling. Therefore, as described above, when the area where the moving living body is present is other than a roadway, the execution time of the safety operation is made later than when the area is a roadway. Thereby, the execution time is made appropriate such that while the safety of the moving living body is ensured, unnecessary execution of the safety operation is reduced. Specifically, when the area where the moving living body is present is a roadway, and the probability that the moving living body will cross the road on which the vehicle is traveling is high, the execution time of the safety operation is made earlier, thus ensuring safety of the moving living body. In contrast, when the area where the moving living body is present is other than a roadway (i.e., a sidewalk or the like), and the moving living body will not necessarily cross the road on which the vehicle is traveling, the execution time of the safety operation is delayed, thus reducing unnecessary execution of the safety operation.

The above described vehicle safety apparatus may be configured such that the controller determines whether the road condition of the area where the moving living body is present is a first condition, in which the road condition is other than a roadway, a second condition, in which the road condition is a roadway and other than an opposing traffic lane, or a third condition, in which the road condition is a roadway and an opposing traffic lane. The controller delays the execution time of the safety operation in the following order, from earliest to latest, the third condition, the second condition, and the first condition. The probability that the moving living body will cross the road on which the vehicle is traveling increases when the road condition is the first condition, the second condition, and the third condition in that order. In contrast, the probability that the moving living body will not cross the road on which the vehicle is traveling increases when the road condition is the third condition, the second condition, and the first condition in that order. Therefore, as described above, by delaying the execution time of the safety operation in the third condition, the second condition, and the first condition, from earliest, to latest, the execution time is made appropriate such that, while the safety of the moving living body is ensured, unnecessary execution of the safety operation is reduced. Specifically, the higher the probability that the moving living body will cross the road on which the vehicle is traveling, the earlier the execution time of the safety operation. Thus, the safety of the moving living body is ensured. In contrast, the higher the probability that the moving living body will not cross the road on which the vehicle is traveling, the later the execution time of the safety operation. Thus, unnecessary execution of the safety operation is reduced.

The above described vehicle safety apparatus may be configured such that the controller executes the safety operation when the distance from the moving living body to the intersection of a line extending in a moving direction of the moving living body and a line extending in the advancing direction of the vehicle is shorter than a threshold A1. The controller delays the execution time of the safety operation by making the threshold value A1 shorter. When the moving living body moves in a direction that crosses the road on which the vehicle is traveling, time is required to shorten the distance from the moving living body to the intersection. Therefore, by making the threshold value A1 shorter, the execution time of the safety operation is reliably delayed.

The above described vehicle safety apparatus may be configured such that the controller executes the safety operation when the predicted time taken for the moving living body to reach the vehicle is shorter than a threshold value A2. The controller delays the execution time of the safety operation by making the threshold value A2 shorter. When the moving living body moves in a direction that crosses the road on which the vehicle is traveling, time is required for the predicted time to become shorter. Therefore, by making the threshold value A2 shorter, the execution time of the safety operation is reliably delayed.

The above described vehicle safety apparatus may be configured such that the controller executes the safety operation when the speed at which the moving living body moves is equal to or higher than a threshold value A1. The controller delays the execution time of the safety operation by making the threshold value A3 higher. When the moving living body moves in a direction that crosses the road on which the vehicle is traveling, time is required for the moving living body to increase the speed at which he or she moves. Therefore, by making the threshold value A3 longer, the execution time of the safety operation is reliably made later.

The above described vehicle safety apparatus is preferably configured such that the safety operation is an automatic braking operation in which a brake device for the vehicle is automatically turned on. As the road condition of the area where the moving living body is present requires an earlier performance of the safety operation, the controller increases braking force based on the automatic braking operation. The probability that the moving living body will cross the road on which the vehicle is traveling increases as the road condition requires that the safety operation be performed earlier. Therefore, rendering braking force based on the automatic braking operation variable, as described above, makes it possible to more reliably ensure the safety of the moving living body.

It is preferable that, during the safety operation, the controller of the vehicle safety apparatus vary the stopping mode for the safety operation as described below. That is the controller is configured such that, during execution of the safety operation, if the road condition is the first condition, the controller stops the safety operation when a vehicle driver performs an ON operation of an accelerator operation member or an ON operation of a brake operation member. If the road condition is the second condition, the controller stops the safety operation when the driver performs an ON operation of the brake operation member. If the road condition is the third condition, the controller does not stop the safety operation based on either an ON operation of the accelerator operation member or an ON operation of the brake operation member by the driver. The probability that the moving living body will cross the road on which the vehicle is traveling increases when the road condition is the first condition, the second condition, and the third condition in that order. Therefore, changing, as described above, the stopping mode for the safety operation being executed, makes it possible to more reliably ensure the safety of the pedestrian.

MODES FOR CARRYING OUT THE INVENTION

A vehicle safety apparatus according to one embodiment of the present invention will now be described with reference to FIGS. 1 to 6.

Figure 1:
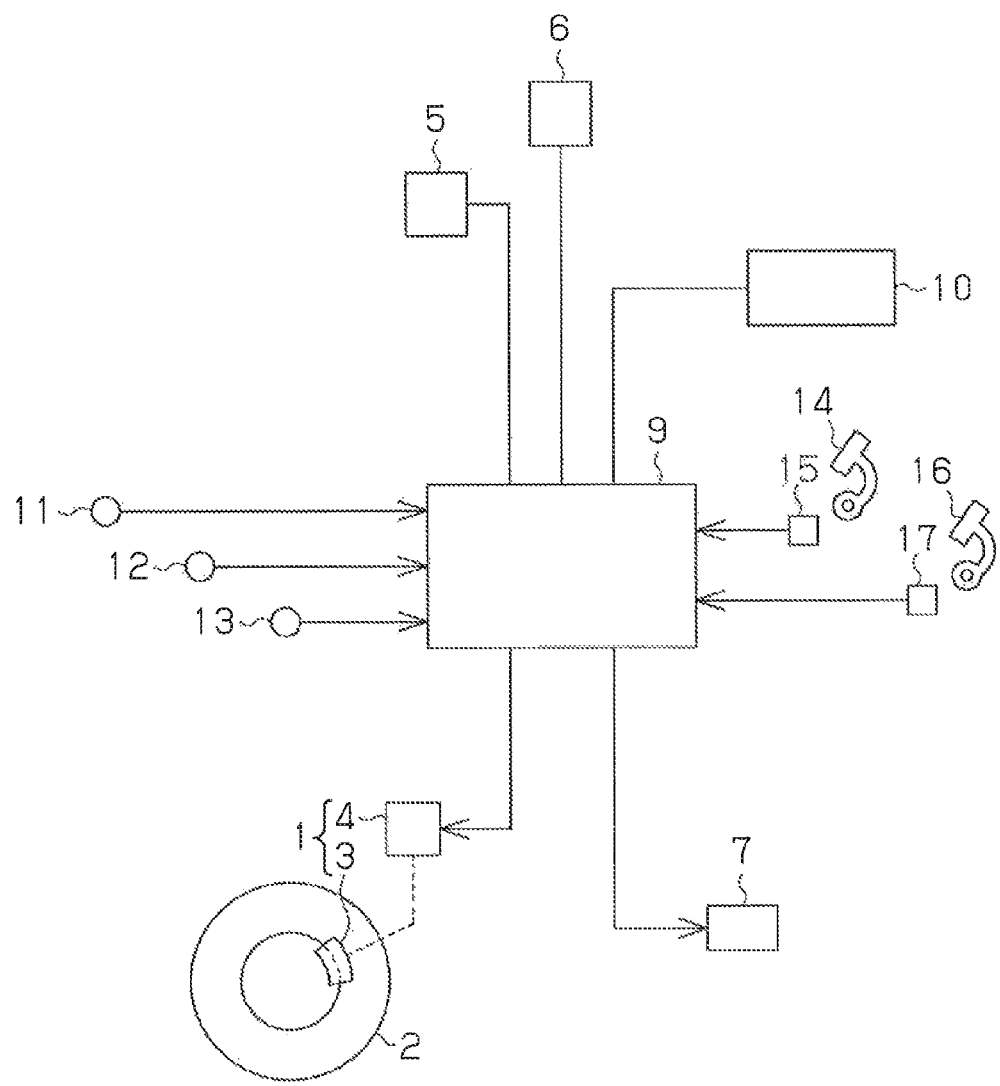
FIG. 1 is a schematic diagram of a vehicle safety apparatus.

A vehicle safety apparatus shown in FIG. 1 includes a system ECU 9 for executing various controls of the vehicle, such as drive control for a brake device 1, which brakes the vehicle traveling, and drive control for an alarm 7, which warns the vehicle driver. The brake device 1 includes a brake caliper 3 for regulating rotation of a corresponding wheel 2, and an actuator 4 for driving the brake caliper 3. As the alarm 7 may be, for example, a warning lamp, a beeper, or a display.

The system ECU 9 is connected to, for example, a steering angle sensor 11, which detects the steering angle of a steering wheel when the vehicle turns, a yaw rate sensor 12, which detects the rate at which the angle of rotation changes when the vehicle turns, and a wheel speed sensor 13, which detects the rotational speed of the wheel 2. The ECU 9 is also connected to a brake sensor 15, which detects a driver's operation (ON operation) of stepping on a brake pedal (brake operation member) 14 in order to activate the brake device 1, and an accelerator position sensor 17, which detects the degree of operation of an accelerator pedal (accelerator operation member) 16 performed by the driver.

The vehicle safety apparatus includes, for example, a radar 5 that transmits a detection wave, such as a millimeter wave, forward in the advancing direction of the vehicle and receives a reflected wave when the detection wave is reflected, a camera 6, which photographs a place ahead of the vehicle in the advancing direction of the vehicle, and a navigation system 10, which, when the vehicle is driven, provides the driver with support information based on, for example, map information and current position of the vehicle. The radar 5, the camera 6, and the navigation system 10 are connected to the system ECU 9. The system ECU 9 monitors transmission of the detection wave and reception of the reflected wave on the radar 5. Based on time (propagation time) required from transmission of the detection wave to reception of the reflected wave and the frequency difference between the detection wave and reflected wave due to the Doppler effect and the like, and also based on images photographed by the camera 6, the ECU9 obtains information about an object present ahead in the advancing direction of the vehicle.

Based on the obtained information about the object present ahead in the advancing direction of the vehicle, the system ECU 9 determines whether there is any moving living body (e.g., pedestrian) in an area that is ahead in the advancing direction of the vehicle traveling on a road and adjacent to the road and whether, for example, the pedestrian is moving within the area in a direction that crosses the road.

When the pedestrian in an area that is ahead in the advancing direction of the vehicle traveling on the road and is adjacent to the road moves in a direction that crosses the road, the system ECU 9 carries out a safety operation to ensure the safety of the pedestrian. An example of such a safety operation may be an automatic brake operation in which braking by the brake device 1 of the vehicle is automatically carried out. Another example of the safety operation may be warning the vehicle, driver by means of the alarm 7, such as indicating a warning by means of a warning light or display or emitting a warning sound by means of a beeper.

The execution time of the safety operation has to be set at an early stage in order to ensure the safety of pedestrians since it is not easy to predict movement of a pedestrian who might suddenly start running. However, setting the execution time of the safety operation at an early stage may prove unnecessary due to a change in the movement of the pedestrian such as the pedestrian changing his or her moving direction or stopping after execution of the safety operation. In such a case, since the driver of the vehicle may feel that the safety operation was unnecessarily executed, he or she may experience discomfort due to the unnecessary execution.

In order to cope with such a problem, the system ECU 9 has the function of a controller. Specifically, when the pedestrian in an area that is ahead in the advancing direction of the vehicle traveling on the road and is adjacent to the road moves in a direction that crosses the road, the system ECU 9 changes the execution time of the safety operation according to the road condition of the area where the pedestrian is present. Examples of the road condition of the area where the pedestrian is present include a first condition, in which the road condition is other than a roadway, such as a sidewalk, a second condition, in which the road condition is a roadway and is other than an opposing traffic lane, and a third condition, in which the road condition is a road way and is an opposing traffic lane. Whether the road condition of the area is in the first, second, or third condition can be determined based on information about an object (e.g., a guardrail, oncoming vehicles) present ahead in the advancing direction of the vehicle, which is obtained using the radar 5, the camera 6, the navigation system 10, and the like.

Figure 2:
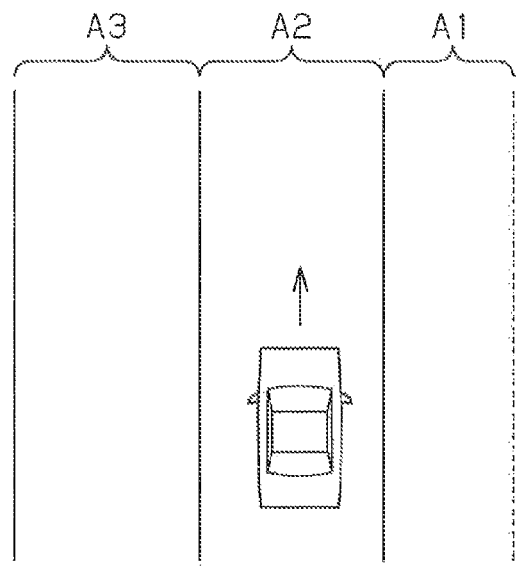
FIG. 2 is a schematic diagram showing the structure of a road on which the vehicle is traveling.

For example, the road shown in FIG. 2 has a structure having a traffic zone A2, in which vehicles travel, a traffic zone A3, in which vehicles travel in the opposite direction to those in the traffic zone A2, and a sidewalk A1 adjacent to the traffic zone A2. When a vehicle is traveling in the traffic zone A2, the traffic zone A3 (opposing traffic lane) and the sidewalk A1 are adjacent to the road (traffic zone A2) on which the vehicle travels. Therefore, in this case, the first or third condition as described above is likely to occur.

Figure 3:
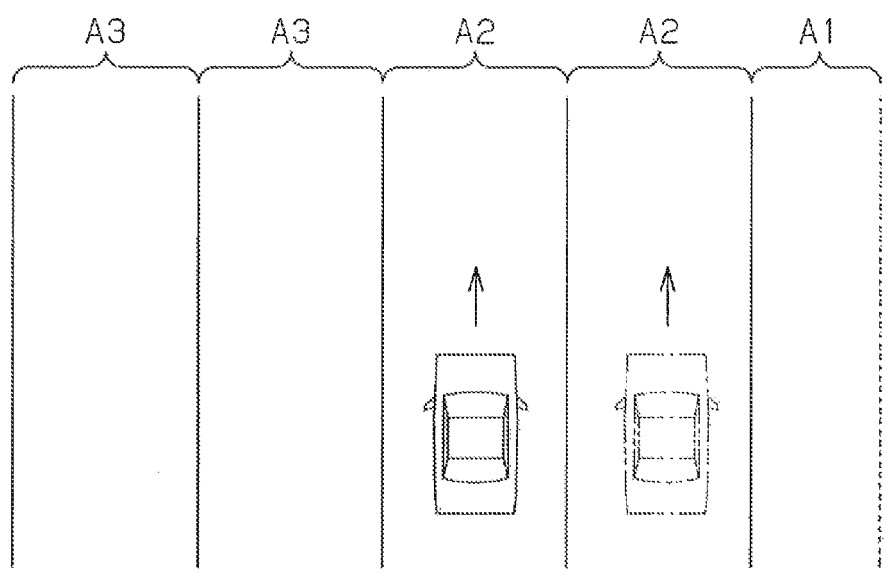
FIG. 3 is a schematic diagram showing the structure of another road on which the vehicle is traveling.

The road shown in FIG. 3 has a plurality of traffic zones A2 and a plurality of traffic zones A3 (in this example, two zones each), and has a sidewalk A1 adjacent to the traffic zone A2 that is furthest away from the traffic zones A3. When a vehicle travels, as indicated by solid lines, in the traffic zone A1 nearer to the traffic zones A3, one traffic zone A3 (opposing traffic lane) and the traffic zone A2 furthest away from the traffic zones A3 are adjacent to the road (traffic zone A2) on which the vehicle is traveling. Therefore, in this case, the second or third condition as described above is likely to occur.

In the road shown in FIG. 3, when a vehicle travels, as indicated by long dashed double-short dashed lines, in the traffic zone A2 that is furthest away from the traffic zones A3, the traffic zone A2 nearer to the traffic zones A3 and the sidewalk A1 are adjacent to the road (traffic zone A2) on which the vehicle is traveling. Therefore, in this case, the first or second condition as described above is likely to occur.

The system ECU 9 determines whether the road condition of the area where the pedestrian is present is the first condition in which the road condition is other than a roadway, the second condition in which the road condition is a roadway with other than opposing traffic lanes, or the third condition in which the road condition is a roadway with opposing traffic lanes. The system ECU 9 delays the execution time of the safety operation in the following order from earliest to latest: the third condition, the second condition, and the first condition.

Operation of the vehicle safety apparatus will now be described.

When a moving living body (e.g., pedestrian) in an area that is ahead in the advancing direction of a vehicle traveling on a road and is adjacent to the road moves in a direction that crosses the road, whether the pedestrian will crosses the road, in other words, the probability of the pedestrian's crossing the road, changes according to the road condition of the area where the pedestrian is present. That is, the probability that the pedestrian will cross the road on which the vehicle is traveling increases when the road condition is the first condition, the second condition, and the third condition in that order. Conversely, the probability that the pedestrian will not cross the road on which the vehicle is traveling increases when the road condition is the third condition, the second condition, and the first condition in that order. Therefore, as described above, by delaying the execution time of the safety operation in the first condition, the second condition, and the third condition, from earliest to latest, the execution time can be made appropriate such that while the safety of the moving living body is ensured, unnecessary execution of the safety operation is reduced. Specifically, the higher the probability that the moving living body will cross the road on which the vehicle is traveling, the earlier the execution time of the safety operation. Thus, the safety of the moving living body is ensured. In contrast, the higher the probability that the moving living body will not cross the road on which the vehicle is traveling, the later the execution time of the safety operation. Thus, unnecessary execution of the safety operation is reduced.

Figure 4:
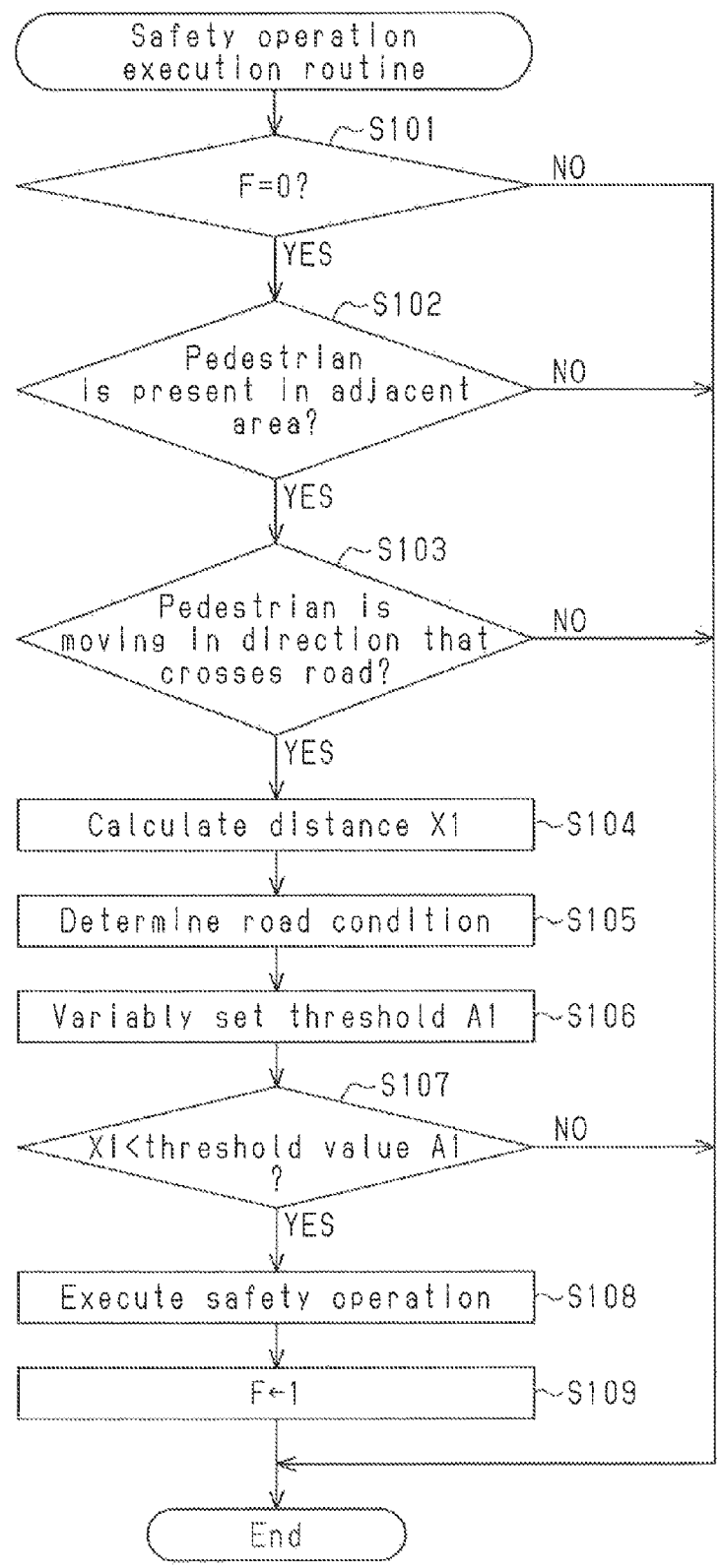
FIG. 4 is a flowchart showing a procedure for initiating a safety operation.
Figure 5:
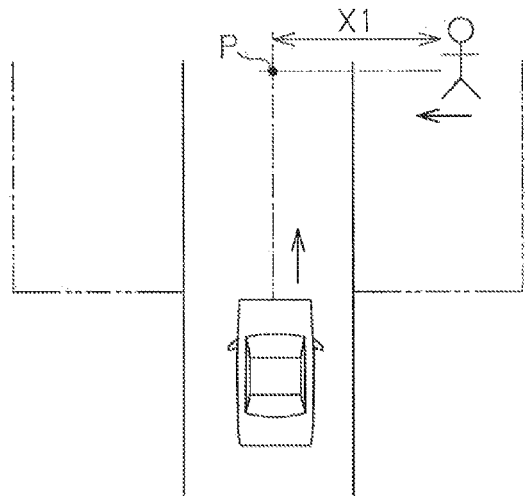
FIG. 5 is a schematic diagram showing the relationship between a vehicle and a pedestrian.

FIG. 4 is a flowchart illustrating the safety operation execution routine for initiating the safety operation. This safety operation execution routine is periodically carried out through the system ECU 9 in an interrupting manner, for example, at predetermined time intervals.

As a process in step 101 (S101) of the routine, the system ECU 9 determines whether a flag F, which is used to determine whether the safety operation is being executed, is 0 (not being executed). If the determination is NO, the system ECU 9 temporarily ends the safety operation execution routine. In contrast, if the determination is YES in the process in S101, the routine proceeds to S102. As a process in S102, the ECU 9 obtains whether an object is present ahead in the advancing direction of a vehicle by means of the radar 5, the camera 6, the navigation system 10, and the like, and determines based on information about the object whether there is any pedestrian in an area that is ahead in the advancing direction of the vehicle traveling on a road and is area adjacent to the road. If the determination is YES, the system ECU 9 determines, as a process in S103, whether the moving direction of the pedestrian is a direction that crosses the road on which the vehicle is traveling, based on information about the pedestrian obtained using the radar 5, the camera 6, the yaw rate sensor 12, the wheel speed sensor 13, and the like.

If the determination is NO in either S102 or S103, the system ECU 9 temporarily ends the safety operation execution routine. In contrast, if the determinations are YES in both S102 and S103, the system ECU 9 performs a series of processes (S104 to S109) for executing the safety operation. In this series of processes, the system ECU 9 executes the safety operation when a distance X1 from the pedestrian to the intersection P (the intersection P in FIG. 5) of the moving direction of the pedestrian and the advancing direction of the vehicle is shorter than a threshold value A1. Therefore, the longer the threshold value A1 is set, the earlier the execution time of the safety operation (i.e., the safety operation is executed when the pedestrian is farther from the intersection P). Therefore, the shorter the threshold value A1 is set, the later the execution time of the safety operation (i.e., the safety operation is executed when the pedestrian is closer to the intersection P).

In this series of processes, the system ECU 9 obtains, in the process of step S104 in FIG. 4, the intersection P of the moving direction of the pedestrian and the advancing direction of the vehicle and calculates distance X1 from the pedestrian to the intersection P. The advancing direction of the vehicle is obtained based on, for example, the rate at which the angle of rotation changes when the vehicle turns, which is detected by the yaw rate sensor 12, and the steering angle of the steering wheel, which is detected by the steering angle sensor 11. Thereafter, the system ECU 9 determines, as a process in S105, whether the road condition of the area where the pedestrian is present is a first, second, or third condition. Also, the system ECU 9 variably sets, as a process in S106, the threshold value A1 according to the result of the determination of the road condition. Specifically, the threshold value A1 is variably set so as to decrease in the following road condition order: the third condition, the second condition, and the first condition, from the longest to shortest.

Then, the system ECU 9 determines, as a process in S107, whether the distance X1 is shorter than the threshold value A1. If the distance X1 is equal to or longer than the threshold value A1, the system ECU 9 temporarily ends the safety operation execution routine. In contrast, if the distance X1 is shorter than the threshold value A1, the system ECU 9 executes, as a process in step S108, the safety operation, and then sets, as a process in S109, the flag F as 1 (being executed). Due to the variable setting of the threshold value A1, the execution time of the safety operation is rendered later according to the road condition of the area where the pedestrian is present in the following order: the third condition, the second condition, and the first condition. Additionally, in order to carry out an automatic braking operation resulting from the execution of the safety operation, the system ECU 9 varies braking force based on the automatic braking operation according to the road condition of the area where the pedestrian is present. Specifically, braking force based on the automatic braking operation increases as the time of the safety operation for the road condition of the area where the pedestrian is present becomes earlier, in other words, in the following road condition order: the first condition, the second condition, and the third condition, from earliest to latest.

Figure 6:
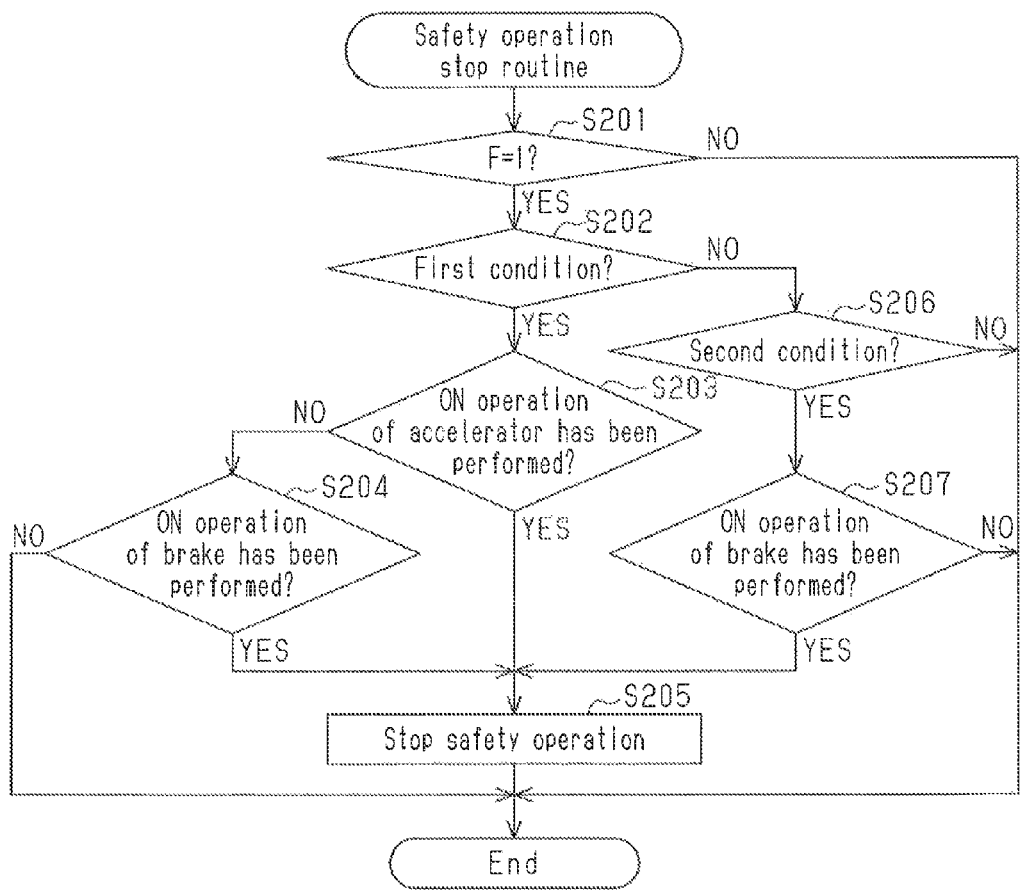
FIG. 6 is a flowchart showing a procedure for stopping the safety operation.

FIG. 6 is a flowchart illustrating a safety operation stop routine for stopping the safety operation being executed. This safety operation stop routine is also periodically carried out through the system ECU 9 in an interrupting manner, for example, at predetermined time intervals.

The system ECU 9 determines, as a process in S201 of the routine, whether a flag F is 1 (being executed). If the determination is YES, the ECU 9 determines, as a process in S202, whether the road condition of the area where the pedestrian is present is the first condition. If the road condition of the area were the pedestrian is present is the first condition, the system ECU 9 determines, as a process in S203, whether an ON operation of the accelerator pedal 16 has been performed, and then, as a process in S204, whether an ON operation of the brake pedal 14 has been performed. If the determinations are NO in both S203 and S204, the system ECU 9 temporarily ends the safety operation stop routine. In contrast, if the determination is YES in either S203 or S204, the system ECU 9 stops, as a process in S205, the safety operation being executed, also sets the flag F as 0 and then ends the safety stop routine.

In a process in S202, if the road condition of the area where the pedestrian is present is not the first condition, the routine proceeds to S206. The system ECU 9 determines, as a process in S206, whether the road condition of the area where the pedestrian is present is the second condition. If the road condition of the area were the pedestrian is present is the second condition, the routine proceeds to S207. The system ECU 9 determines, as a process in S207, whether an ON operation of the brake pedal 14 has been performed. If the determination is YES, the routine proceeds to S205 and stops the safety operation being executed. In contrast, if the determination is NO in S206, in other words, if the road condition of the area where the pedestrian is present is the third condition, the system ECU 9 temporarily ends the safety operation stop routine. If the determination is NO as well as in S207, the system ECU 9 temporarily ends the safety operation stop routine.

The above described embodiment achieves the following advantages.

(1) When a moving living body (e.g., pedestrian) in an area that is ahead in the advancing direction of a vehicle traveling on a road and is adjacent to the road moves in a direction that crosses the road, the system ECU 9 changes the execution time of the safety operation to ensure the safety of the pedestrian. Specifically, the system ECU 9 determines whether the road condition of the area where the pedestrian is present is the first condition, in which the road condition is other than a roadway, the second condition, in which the road condition is a roadway and is other than an opposing traffic lane, or the third condition, in which the road condition is a roadway and is an opposing traffic lane. The system ECU 9 delays the execution time of the safety operation in the following order, from latest to earliest: the third condition, the second condition, the and first condition. The probability that the pedestrian will cross the road on which the vehicle is traveling increases when the road condition is the first condition, the second condition, and the third condition in that order. Conversely, the probability that the pedestrian will not cross the road on which the vehicle is traveling increases when the road condition is the third condition, the second condition, and the first condition in that order. Therefore, as described above, by delaying the execution time of the safety operation in the first condition, the second condition, and the third condition in that order, the execution time is made appropriate in order that while the safety of the moving living body is ensured, unnecessary execution of the safety operation is reduced. Specifically, the higher the probability that the pedestrian will cross the road on which the vehicle is traveling, the earlier the execution time of the safety operation. Thus, the safety of the moving living body is ensured. Conversely, the higher the probability that the moving living body will not cross the road on which the vehicle is traveling, the later the execution time of the safety operation. Thus, unnecessary execution of the safety operation required is reduced.

(2) The system ECU 9 executes the safety operation when the distance X1 from the pedestrian to the intersection P of the line extending in the moving direction of the pedestrian and the line extending in the advancing direction of the vehicle is shorter than a threshold value A1. Time is required to shorten the distance X1 from the pedestrian to the intersection P when the pedestrian moves in a direction that crosses the road on which the vehicle is traveling. Therefore by making the threshold value A1 shorter, the execution time of the safety operation is appropriately delayed.

(3) In order to carry out an automatic braking operation resulting from the execution of the safety operation, the system ECU 9 varies braking force based on the automatic braking operation according to the road condition of the area where the pedestrian is present. Specifically, braking force based on the automatic braking operation increases as the time of the safety operation for the road condition of the area where the pedestrian is present becomes earlier, in other words, in the following road condition order: the first condition, the second condition, and the third condition, from earliest to latest. The probability that the pedestrian will cross the road on which the vehicle is traveling increases when the road condition is the first condition, the second condition, and the third condition in that order. Therefore, rendering braking force based on the automatic braking operation variable, as described above, makes it possible to more reliably ensure the safety of the pedestrian by the safety operation.

(4) During the safety operation, the system ECU 9 changes a stopping mode for the safety operation as described below. Specifically, the system ECU 9 stops the safety operation when the driver performs an ON operation of the accelerator pedal 16 or an ON operation of the brake pedal 14 if the road condition is the first condition during the safety operation. The system ECU 9 stops the safety operation when the driver performs an ON operation of the brake pedal 14 if the road condition is the second condition during the safety operation. The system ECU 9 does not stop the safety operation even when the driver performs an ON operation of the accelerator pedal 16 or an ON operation of the brake pedal 14 if the road condition is the third condition. The probability that the pedestrian will cross the road on which the vehicle is traveling increases when the road condition is the first condition, the second condition, and third condition in that order. Therefore, changing, as described above, the stopping mode for the safety operation being executed, makes it possible to more reliably ensure the safety of the pedestrian.

The above described embodiment may be modified as follows.

The safety operation stay include only warning to a driver by means of the alarm 7 or only the automatic braking operation.

During the safety operation, an automatic wind-up operation may be performed, in which seat belts provided on the vehicle seats are automatically wound up. In this case, in addition to ensuring the safety of the Pedestrian by virtue of the safety operation, it is possible to protect the occupants in the vehicle by virtue of the automatic wind-up operation.

The stopping mode for the safety operation being executed does not necessarily need to be varied according to the road condition of the area where the pedestrian is present.

When braking force based on the automatic braking operation resulting from the execution of the safety operation is decreased due to the first condition, the braking force may be 0. In other words, the automatic braking operation does not necessarily need to be performed.

The braking force in the automatic braking operation does not necessarily need to be varied according to the road condition of the area where the pedestrian is present.

Instead of executing the safety operation when the distance X1 from the pedestrian to the intersection P is shorter than a threshold value A1, the safety operation may be executed when the speed at which the pedestrian moves (speed V1 in FIG. 7) is equal to or higher than a threshold value A1. In this case, by making the threshold value A1 higher, the execution time of the safety operation may be made later. When the pedestrian moves in a direction that crosses the road on which the vehicle is traveling, time is required for the pedestrian to increase the speed at which he or she moves. Therefore, by making the threshold value A3 higher, the execution time of the safety operation is reliably made later. The speed V1 can be obtained based on information about the pedestrian obtained using the radar 5, the camera 6, and the like.

Figure 7:
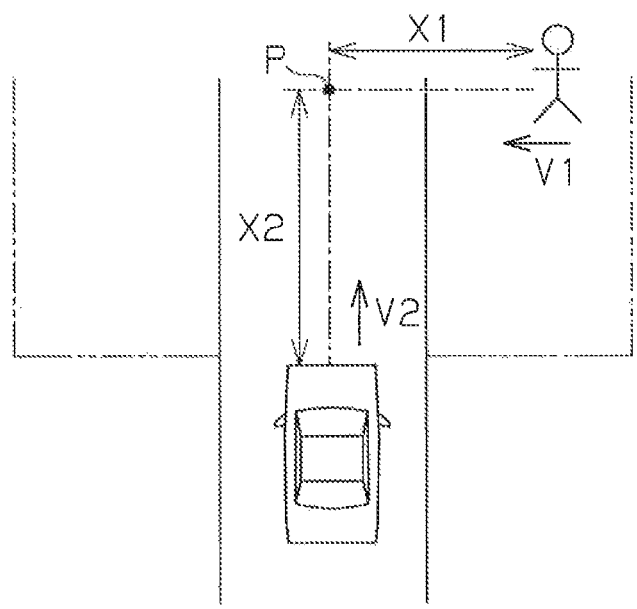
FIG. 7 is a schematic diagram showing the relationship between a vehicle and a pedestrian.

Instead of executing the safety operation when the distance X1 from the pedestrian to the intersection. P is shorter than the threshold value A1, the safety operation may be executed when the predicted time T taken for the pedestrian to reach the vehicle is less ban the threshold value A2. Therefore, by making the threshold value A2 shorter, the execution time of the safety operation is delayed. When the pedestrian moves in a direction that crosses the road on which the vehicle is traveling, time is required for the predicted time T to become shorter. Therefore, by making the threshold value A2 shorter, the execution time of the safety operation is reliably delayed. The predicted time T is obtained using the time T1 taken for the pedestrian to reach the intersection P, and the time T2 for the vehicle to reach the intersection P. The time T1 is obtained based on the distance X1 between the pedestrian and the intersection P1, and the speed V1 of the pedestrian, both of which are shown in FIG. 7. Meanwhile, the time T2 is obtained based on the distance X2 between the vehicle and the intersection P1, and the speed V2 of the vehicle. The distance X2 and the speed V2 are obtained based on information about the pedestrian obtained using the radar 5, the camera 6, and the like, information about the relationship between the pedestrian and the vehicle, and information about the vehicle found out using the yaw rate sensor 12, the wheel speed sensor 13, and the like. When the time T1 and the time T2 are substantially equal, the time (the time T1, the time T2, or the average of them) can be used as the predicted time T.

The threshold values A1 to A3 are changed according to whether the road condition of the area where the pedestrian is present is the first condition, the second condition, or the third condition. However, the threshold values A1 to A3 may be changed according to whether the road condition is a roadway or other than a roadway. Alternatively, the threshold values A1 to A3 may be changed according to whether the road condition is a roadway and an opposing traffic lane or the road condition is a roadway and other than an opposing traffic lane.

A determination may be made whether a road condition of the area where the pedestrian is present is a side of a crosswalk, a school zone, a side of the intersection of roadways, or the like. Then, according to such conditions, the threshold values A1 to A3 may be varied.

As an example of a moving living body, a pedestrian is used in the above embodiment. However, it may be not only a pedestrian but also a bicycle, an animal, and the like.

DESCRIPTION OF THE REFERENCE NUMERALS

1 . . . Brake device, 2 . . . Wheel, 3 . . . Brake caliper, 4 . . . Actuator, 5 . . . Radar, 6 . . . Camera, 9 . . . System ECU, 10 . . . Navigation system, 11 . . . Steering Angle sensor, 12 . . . Yaw rate sensor, 13 . . . Wheel speed sensor, 14 . . . Brake pedal, 15 . . . Brake sensor, 16 . . . Accelerator pedal, 17 . . . Accelerator position sensor

The invention claimed is:

1. A vehicle safety apparatus equipped with a controller, wherein the controller is configured to
   when a moving living body in an area that is ahead in advancing direction of a vehicle traveling on a traffic zone of a road and is adjacent to the traffic zone moves in a direction that crosses the traffic zone, execute a safety operation to ensure safety of the moving living body,
   change an execution time of the safety operation according to the road condition of the area where the moving living body is present,
   determine whether road condition of the area where the moving living body is present is either a roadway and an opposing traffic lane or a roadway and other than an opposing traffic lane, and
   if the road condition is a roadway and other than an opposing traffic lane, make the execution time of the safety-operation later than that used when the road condition is a roadway and an opposing traffic lane.

2. The vehicle safety apparatus according to claim 1, wherein the controller is configured to
   determine whether the road condition of the area where the moving living body is present is a first condition, in which the road condition is other than a roadway, a second condition, in which the road condition is a roadway and other than an opposing traffic lane, or a third condition, in which the road condition is a roadway and an opposing traffic lane, and
   delay the execution time of the safety operation in the following order, from earliest to latest, the third condition, the second condition, and the first condition.

3. The vehicle safety apparatus according to claim 1, wherein the controller is configured to
   execute the safety operation when the distance from the moving living body to the intersection of a line extending in a moving direction of the moving living body and a line extending in the advancing direction of the vehicle is shorter than a threshold A1, and
   delay the execution time of the safety operation by making the threshold value A1 shorter.

4. The vehicle safety apparatus according to claim 1, wherein the controller is configured to
   execute the safety operation when the predicted time taken for the moving living body to reach the vehicle is shorter than a threshold value A2, and
   delay the execution time of the safety operation by making the threshold value A2 shorter.

5. The vehicle safety apparatus according to claim 1, wherein the controller is configured to
   execute the safety operation when the speed at which the moving living body moves is equal to or higher than a threshold value A3, and delay the execution time of the safety operation by making the threshold value A3 higher.

6. The vehicle safety apparatus according to claim 1, wherein the safety operation is an automatic braking operation in which a brake device for the vehicle is automatically turned on, and as the road condition of the area where the moving living body is present requires an earlier performance of the safety operation, the controller is configured to increase braking force based on the automatic braking operation.

7. The vehicle safety apparatus according to claim 2, wherein the controller is configured such that, during execution of the safety operation, if the road condition is the first condition, the controller stops the safety operation when a vehicle driver performs an ON operation of an accelerator operation member or an ON operation of a brake operation member, if the road condition is the second condition, the controller stops the safety operation when the driver performs an ON operation of the brake operation member, and if the road condition is the third condition, the controller does not stop the safety operation based on either an ON operation of the accelerator operation member or an ON operation of the brake operation member by the driver.

* * * * *